Feb. 21, 1967    T. CARTER    3,305,038
AUTOMOTIVE VEHICLE
Filed Dec. 8, 1961    9 Sheets-Sheet 2

INVENTOR.
THOMAS CARTER.
BY McMorrow, Berman
and Davidson
ATTORNEYS.

Feb. 21, 1967   T. CARTER   3,305,038
AUTOMOTIVE VEHICLE
Filed Dec. 8, 1961   9 Sheets-Sheet 3

INVENTOR.
THOMAS CARTER,
BY
McMorrow, Berman
and Davidson
ATTORNEYS.

Feb. 21, 1967  T. CARTER  3,305,038
AUTOMOTIVE VEHICLE
Filed Dec. 8, 1961  9 Sheets-Sheet 4

INVENTOR.
THOMAS CARTER,
BY
McMorrow, Berman & Davidson
ATTORNEYS.

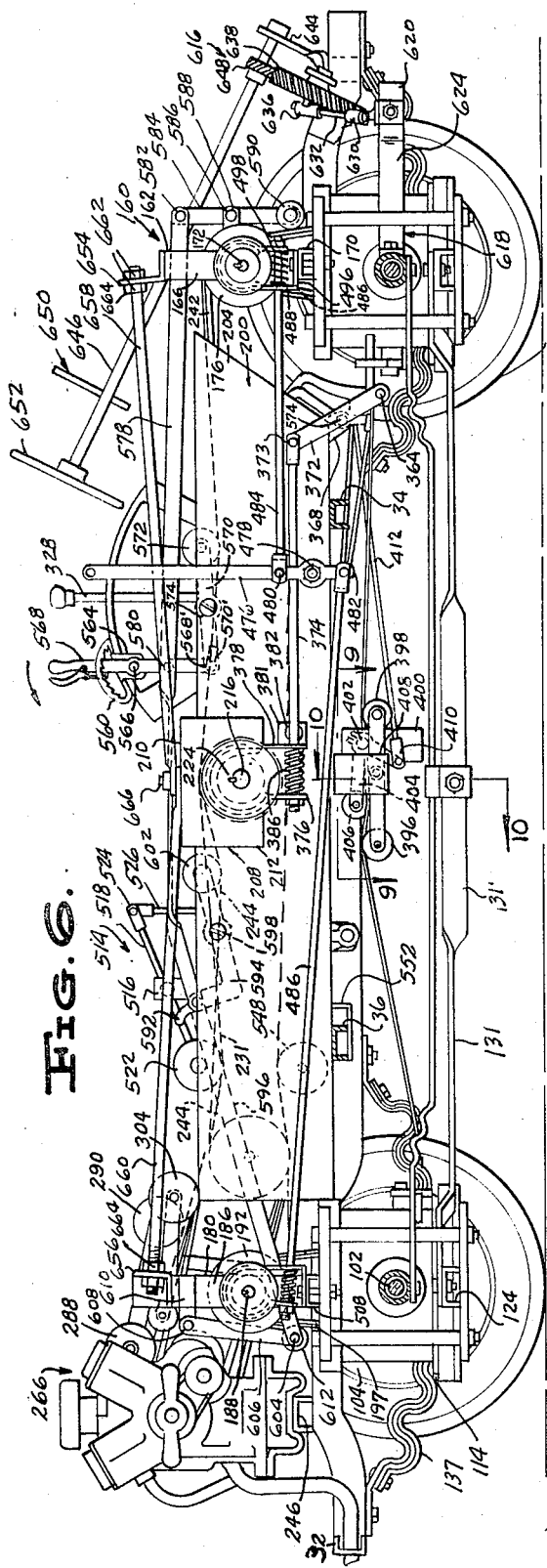

Feb. 21, 1967 T. CARTER 3,305,038
AUTOMOTIVE VEHICLE
Filed Dec. 8, 1961 9 Sheets-Sheet 6
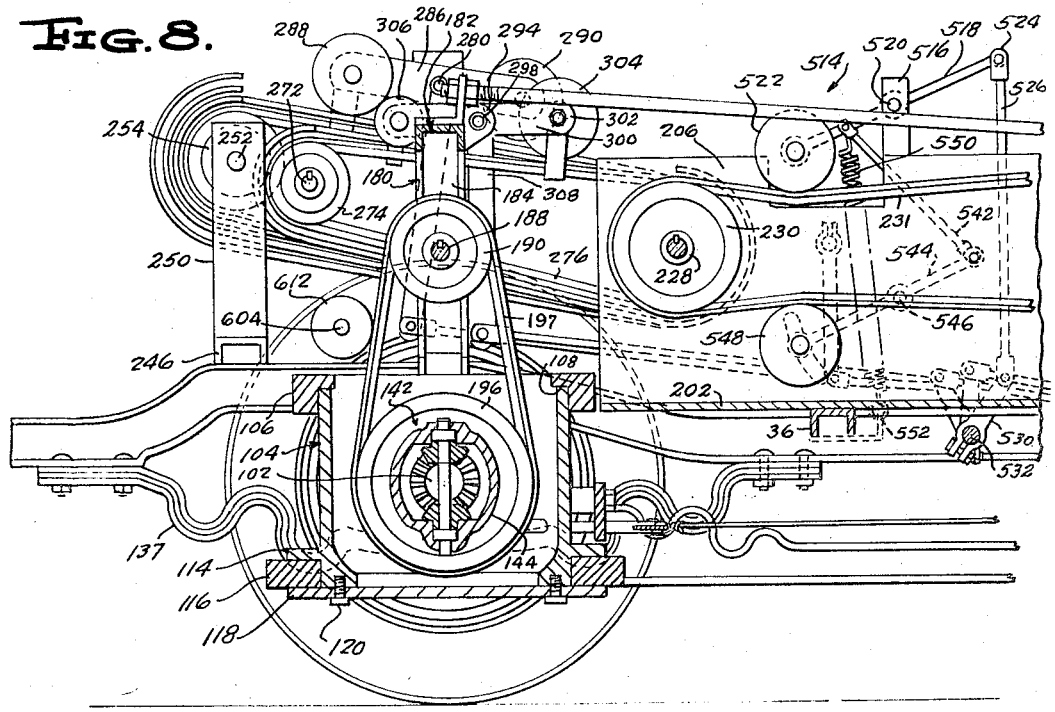
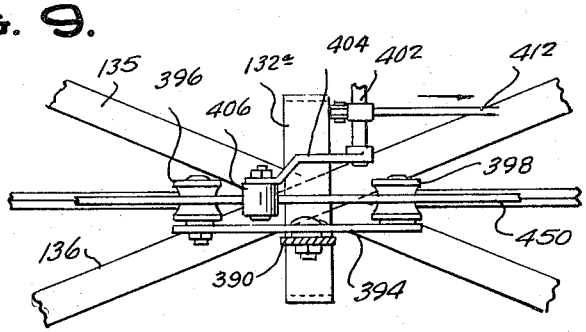
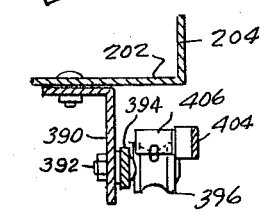
INVENTOR.
THOMAS CARTER,
BY
McMorrow, Berman & Davidson
ATTORNEYS.

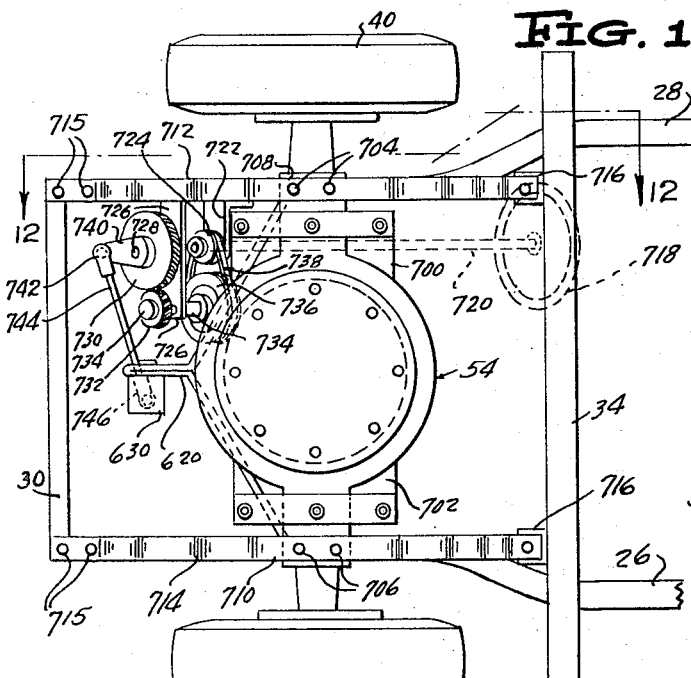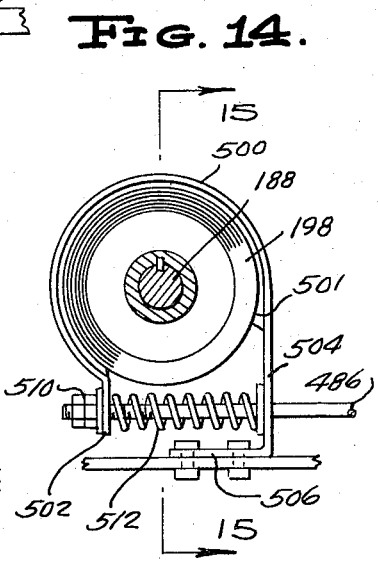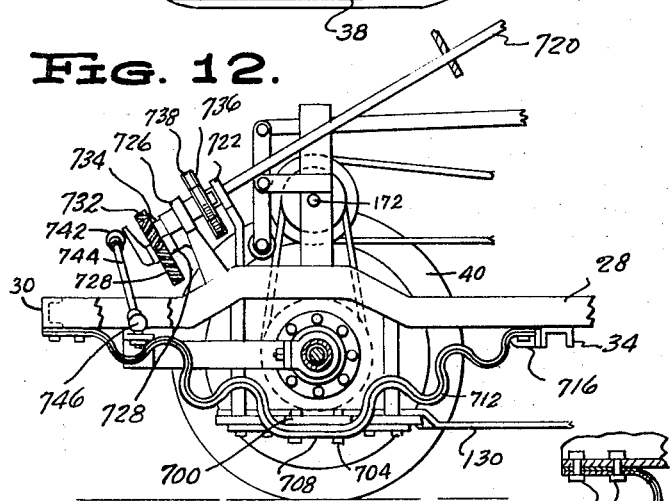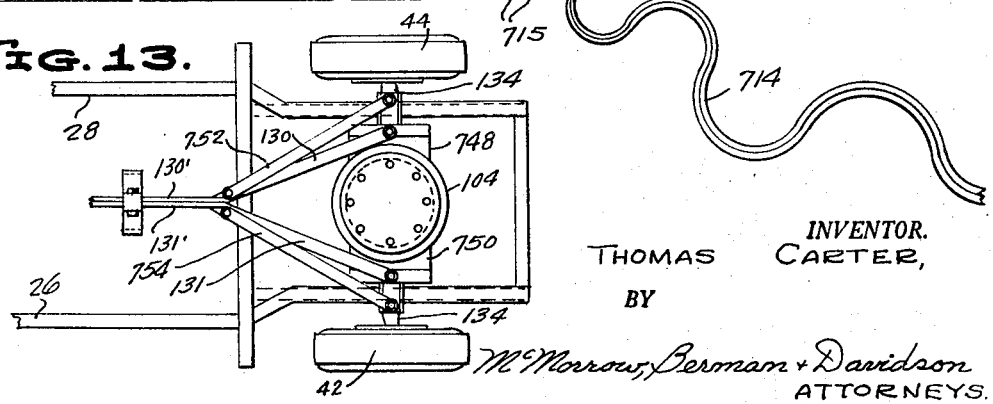

Feb. 21, 1967 T. CARTER 3,305,038
AUTOMOTIVE VEHICLE
Filed Dec. 8, 1961 9 Sheets-Sheet 8

INVENTOR.
THOMAS CARTER,
BY
McMorrow, Berman & Davidson
ATTORNEYS.

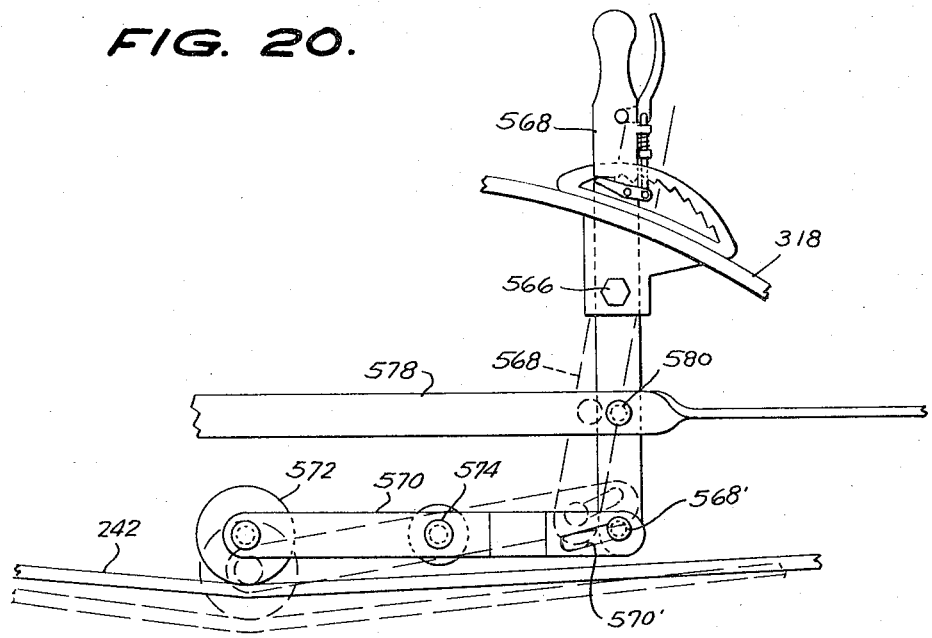

United States Patent Office 3,305,038
Patented Feb. 21, 1967

3,305,038
AUTOMOTIVE VEHICLE
Thomas Carter, Rte. 4, Box 154A,
Franklin, N.C. 28734
Filed Dec. 8, 1961, Ser. No. 157,936
24 Claims. (Cl. 180—50)

This invention relates to the general class of land vehicles and, more specifically, the invention pertains to an improved automotive vehicle.

One of the primary objects of this invention is to provide a land vehicle or automobile wherein perfect circle steering may be obtained and wherein the vehicle is provided with four-wheel driving, steering and braking means, and wherein the power delivered from the motor is imparted in equal increments to all four wheels of the vehicle.

Another object of this invention is to provide differential drive means for each axle of each wheel, and a housing therefor, together with means connected to the axle and differential housings of both pairs of front and rear wheels, whereby all housings are pivoted about a vertical axis during a turn, and wherein all four wheels of the vehicle are conjointly turned when effecting a turn, thereby enabling the operator to describe sharp curves without over-balancing or slowing, and to return to a straight-line driving movement with facility.

A further object of this invention is to provide three independent braking systems which are manually operable by two foot pedals and a hand lever, and in which the hand lever is employed as an emergency brake connected to the differential power input means, and one of the foot pedals operates directly on the central power distributing means. The other of the foot-operated brake pedals operates four brakes, each of which are connected with one of the wheel axles.

Another object of this invention is to provide a spring suspension for the chassis of an automotive vehicle which eliminates the use of spring shackles and shock-absorbing devices.

A still further object of this invention is to provide an automotive vehicle of the four-wheel-drive and four-wheel-steering type incorporating novel driving and steering means and a novel construction in arrangement and means for connecting and supporting its parts, whereby a vehicle is provided that is simpler in construction, lighter in weight in proportion to size, and of greater flexibility and capable of being more easily handled than motor vehicles in common use.

Still another object of this invention is to provide a driving mechanism for an automotive vehicle which avoids the use of heavy driving gears or other working parts and permits a greater portion of the power of the motor to be applied to the driving wheels.

This invention contemplates, as a still further object thereof, the provision of a motor vehicle of light weight and having great stability and speed, the motor vehicle being adapted to be built and operated, as well as maintained in working order at a much lower cost than motor vehicles of the conventional type.

This invention has, as a still further object thereof, the provision of a two-wheel drive and two-wheel steering type of vehicle, all being operable without the use of heavy gearing and drive connections.

Still another object of this invention is to provide a two-wheel drive and two-wheel steering type of vehicle together with means for preventing disengagement of the driving means from the differential when the operator is effecting a turn in any direction.

Other and further objects and advantages of the instant invention will become more evident from a consideration of the following specification when read in conjunction with the annexed drawings, in which:

FIGURE 6 is an enlarged side elevational view, FIGURE 6 being taken substantially on the line 6—6 of FIGURE 5, looking in the direction of the arrows;

FIGURE 7 is a diagrammatic illustration of the three braking systems;

FIGURE 8 is a cross-sectional view taken substantially on the line 8—8 of FIGURE 5, looking in the direction of the arrows;

FIGURE 9 is an enlarged detail fragmentary top plan view of one braking mechanism, FIGURE 9 being taken substantially on the horizontal plane of line 9—9 of FIGURE 6, looking in the direction of the arrows;

FIGURE 10 is an enlarged, fragmentary detail cross-sectional view, FIGURE 10 being taken substantially on the vertical plane of line 10—10 of FIGURE 6, looking in the direction of the arrows;

FIGURE 11 is an enlarged top plan view of a modified form of this invention illustrating a two-wheel steering mechanism for the vehicle;

FIGURE 12 is a side plan view of the vehicle shown in FIGURE 11, FIGURE 12 being taken substantially on the line 12—12 of FIGURE 11, looking in the direction of the arrows;

FIGURE 13 is a fragmentary bottom plan view of the rear end of the modified vehicle;

FIGURE 14 is an enlarged, fragmentary side elevational view of one of the V-belt pulley-type brakes at the rear of the vehicle, FIGURE 14 being taken on the horizontal plane of line 14—14 of FIGURE 1, looking in the direction of the arrows;

FIGURE 15 is a fragmentary, detail cross-sectional view, FIGURE 15 being taken substantially on the vertical plane of line 15—15 of FIGURE 14, looking in the direction of the arrows;

FIGURE 16 is an enlarged, side elevational view of the serpentine spring suspension system employed in the instant vehicle.

FIGURE 20 is a fragmentary view of the idler clutching mechanism of the main drive.

Figure 1:
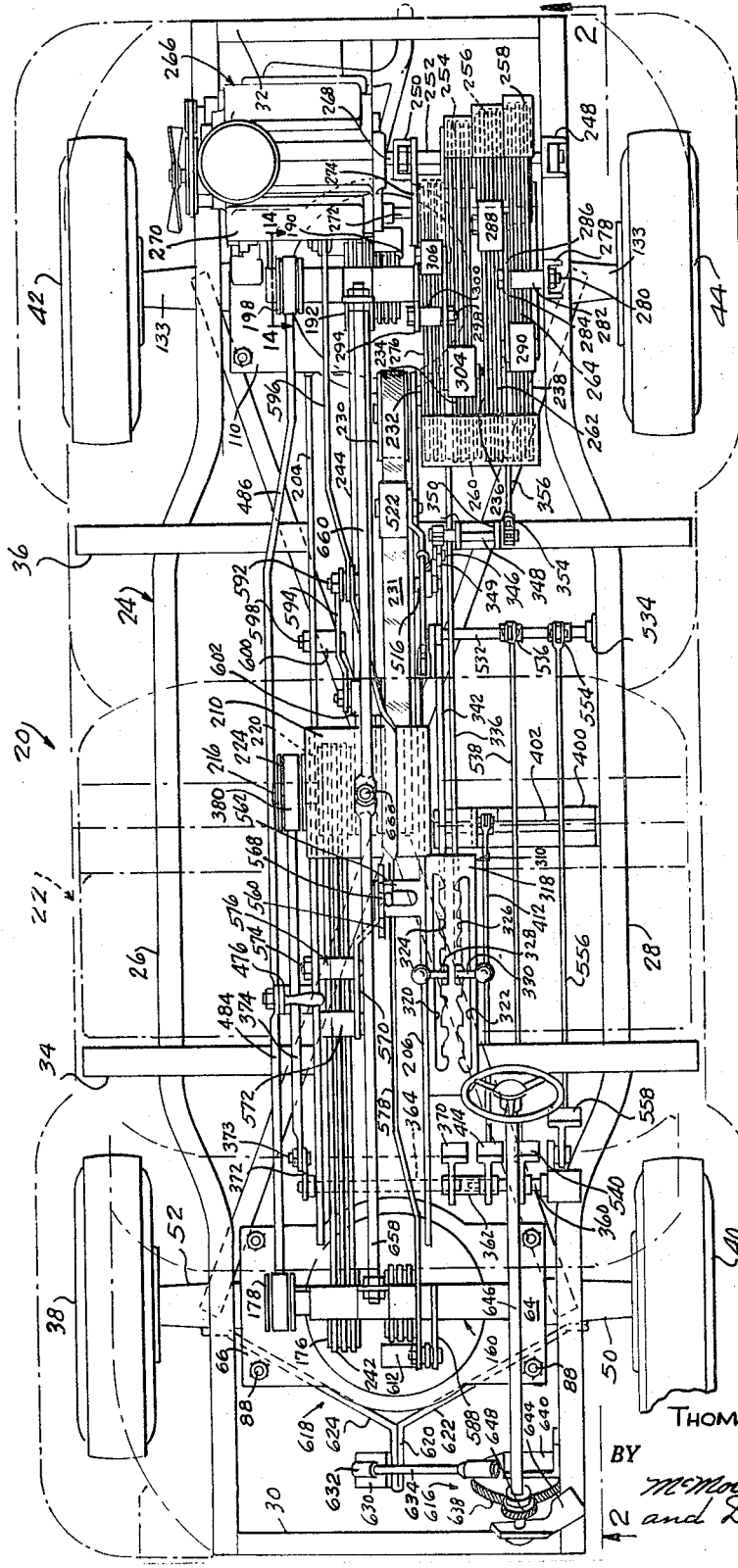
FIGURE 1 is a top plan view of an automotive vehicle constructed in accordance with the teachings of this invention.
Figure 2:
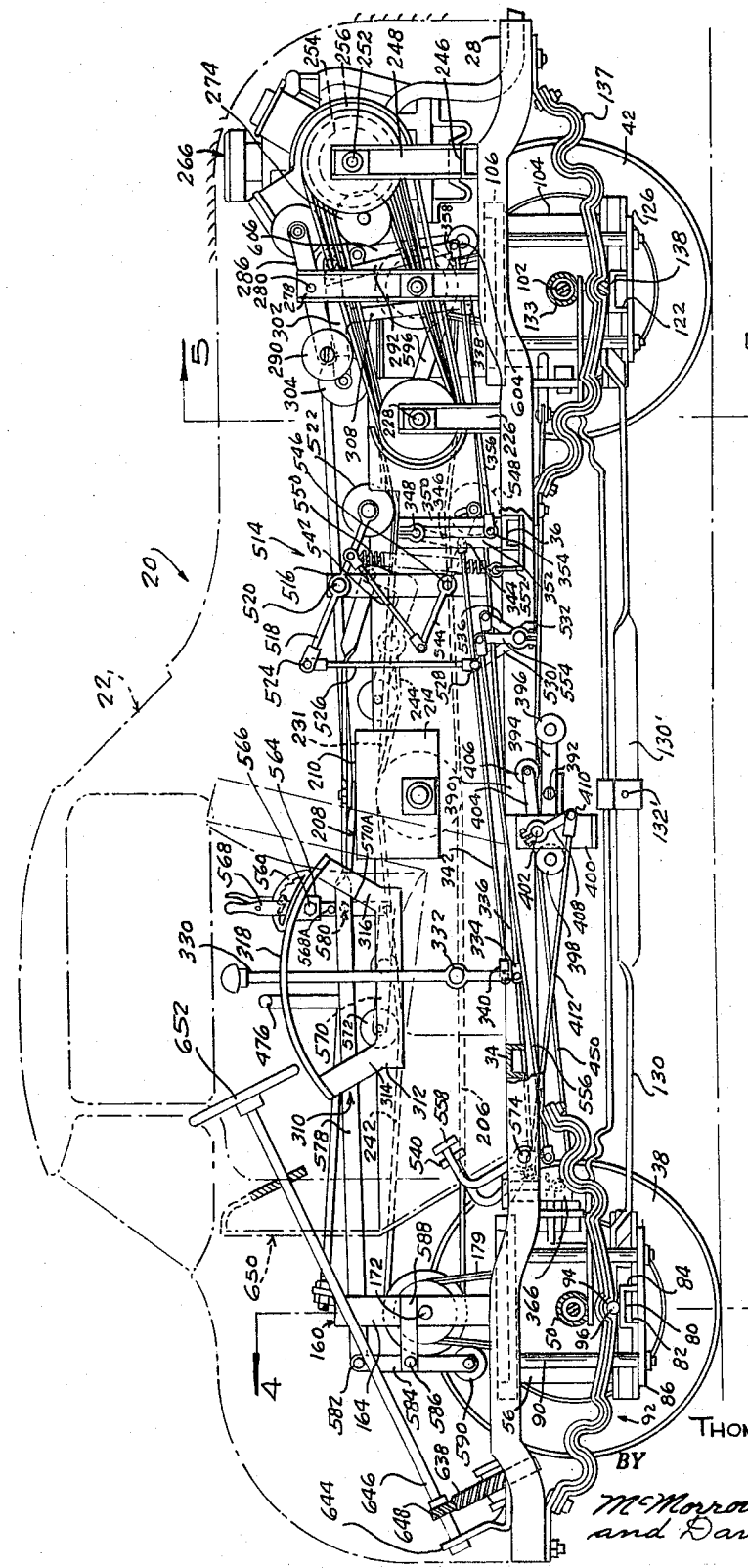
FIGURE 2 is a side elevational view of the vehicle shown in FIGURE 1.
Figure 3:
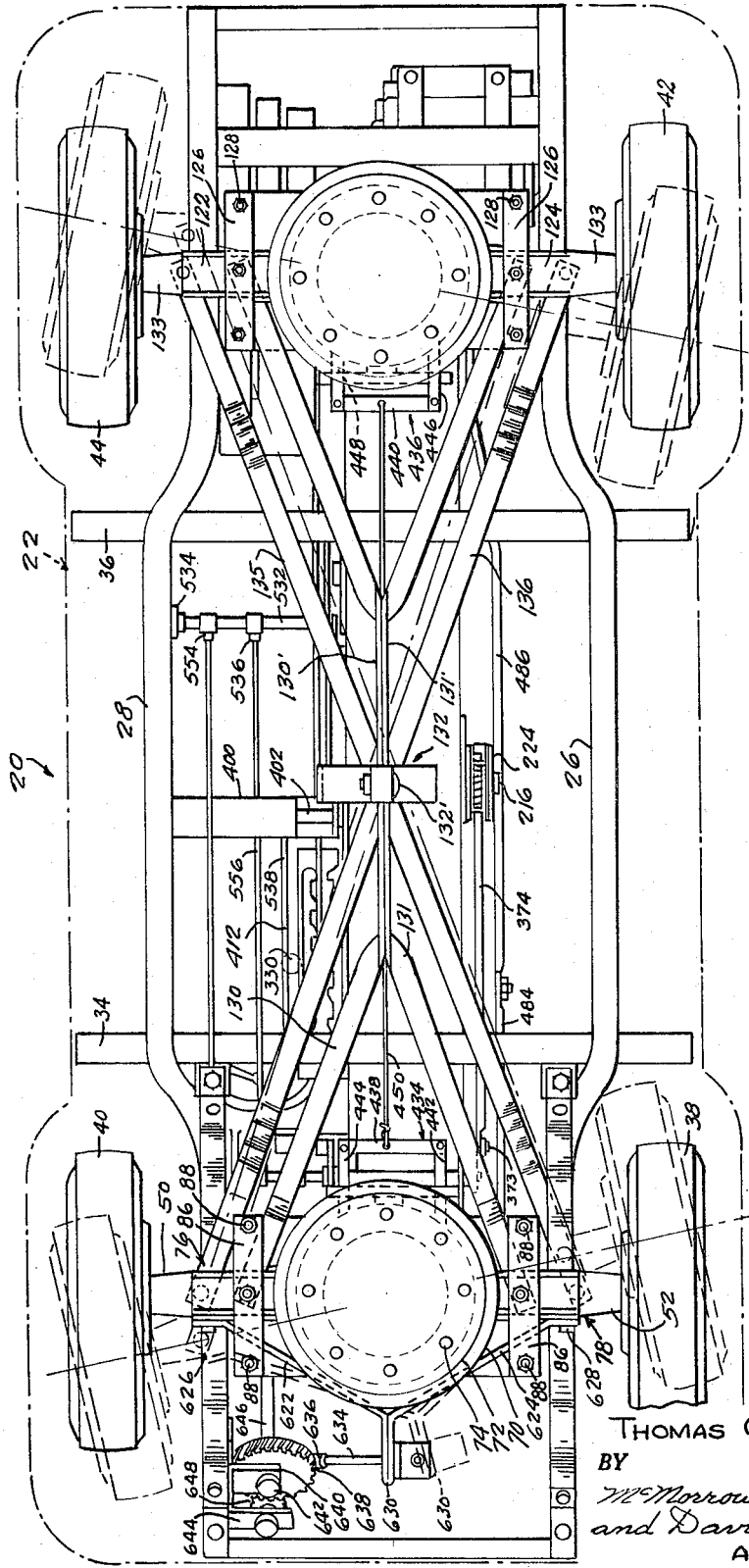
FIGURE 3 is a bottom plan view of the vehicle shown in FIGURES 1 and 2.

Referring now more specifically to the drawings, reference numeral 20 designates, in general, an automotive vehicle constructed in accordance with the teachings of this invention, with the body thereof being shown in dotted lines 22 (see FIGURES 1, 2 and 3). Since the body of the vehicle forms no part of this invention, no further details of its construction will be made herein.

The vehicle 20 is seen to comprise a substantially rectangular chassis frame 24 (see FIGURE 1) which includes a pair of elongated, laterally-spaced channel-shaped side frame members 26, 28 held in spaced relation by longitudinally spaced transversely extending channel-shaped end frame members 30, 32. The chassis frame 24 may also include intermediate cross-frame elements 34, 36 to reinforce the same, and while a substantially box-like chassis has been generally described, supra, it will be understood that other conventional chassis frames may be utilized in the practice of this invention.

The chassis frame 24 is supported on wheels 38, 40, 42, 44 of which the wheels 38, 40 are herein defined as being the front wheels, and the wheels 42, 44 are to be known as the rear wheels.

Figure 4:
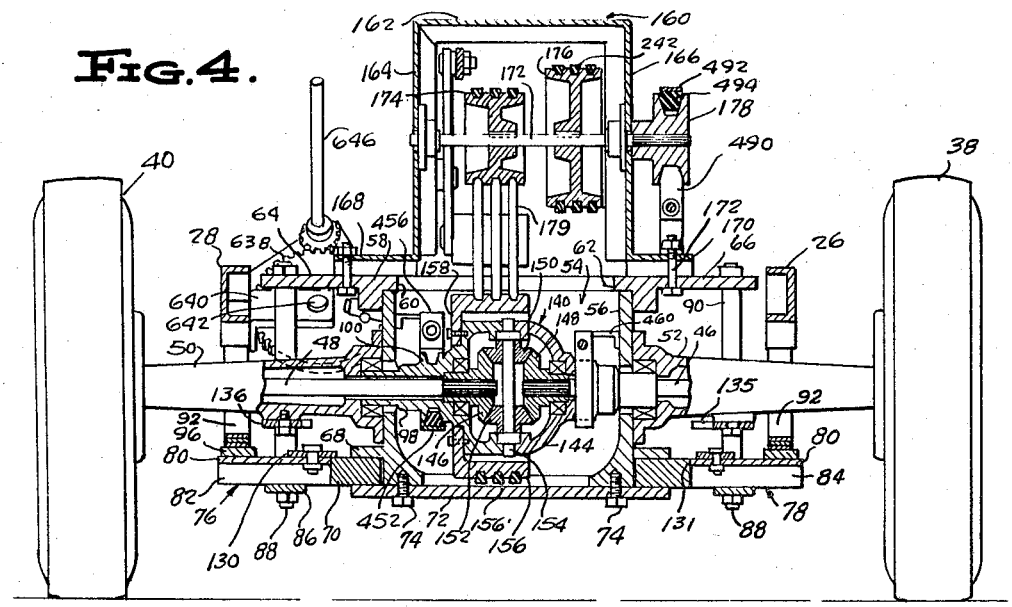
FIGURE 4 is an enlarged detail cross-sectional view taken substantially on the plane of line 4—4 of FIGURE 2, looking in the direction of the arrows.

The front wheels 38, 40 are mounted on normally horizontally extending axles 46, 48, respectively, for rotation therewith (see FIGURE 4). The axles 46, 48 are surrounded by normally horizontally extending axle housings 50, 52 which are rigidly secured to and extend laterally and radially from a vertically elongated substantially hollow cylindrical differential housing 54. The housing 54 includes a cylindrical side wall 56 rotatable about a vertical axis and having the upper end thereof journaled in a normally horizontal bearing plate 58 centrally apertured as at 60. The bearing plate 58 is shouldered at 62 to retain the upper end of the side wall 56 and has projecting therefrom radially and diametrically extending flanges 64, 66 of flat rectangular configuration (see FIGURE 4). These extensions overhang the axle housings 50, 52 in vertically spaced relation relative thereto. The side wall 56 is formed, adjacent its lower end, with a flange 68 that is engaged therebelow by an annular member 70 secured in position by the outer circumferential marginal edge of a cylindrical closure plate 72. The plate 72 is, in turn, fixedly secured by a plurality of bolts 74 to the lower end of the side wall 56.

Projecting from diametrically opposed sides of the annular member 70 are a pair of inverted, substantially U-shaped channel member 76, 78 of identical construction, and each is comprised of a bight 80 from the longitudinally extending marginal edges of which depend side walls 82, 84. Extending transversely across and beyond the lower edges of the side walls 82, 84 are connector bars 86 each having a flat rectangular configuration, and which are rigidly secured to the flanges 64, 66 by bolts 88 encased in spacer sleeves 90 which extend therebetween.

References numeral 92 denotes a serpentine spring-suspension means for the chassis frame 24 at each side of the forward end thereof. The suspension means is seen to comprise a plurality of nested, congruent leaf springs having a convoluted configuration and including a centrally downwardly opening convolution 94 which rides on a transversely extending bearing shaft 96 supported on the bight 80 of each of the channel members 76.

As is seen in FIGURE 4, each of the axles 46, 48 is fitted with an axially extending brake sleeve 98 which is formed with an integral V-belt pulley brake shoe 100 disposed within the differential housing 54. The braking system will be further explained, infra.

Mechanisms similar to those described above are provided at the other or rear end of the vehicle 20, and with specific reference to FIGURES 1, 2, 3, 5 and 6, it is seen that the wheels 42, 44 are connected with rear axles 102 which project through diametrically opposed sides of the differential housing 104 cylindrical in configuration about a vertical axis. As in the case of the front wheels 38, 40, the upper end of the housing 104 is journaled for rotation within a bearing plate 106 that is shouldered at 108 (see FIGURE 8) to provide journal means. The plate 106 carries radially and diametrically extending horizontal flanges 110, 112. As before, the housing 104 is formed with an outwardly extending circumferential flange 114 adjacent its lower end and below which is journaled for rotation an annular member 116. Positioned below the member 116 is a closure plate 118 which extends across the lower end of the housing 104 and is secured thereto by bolts 120. The annular member 116 includes a pair of diametrically extending, inverted substantially U-shaped channel members 122, 124 (see FIGURES 2 and 5). The U-shaped channel members 122, 124 are traversed by connector bars 126 adjacent each outside end thereof, the connector bars 126 being connected to the flanges 110, 112 by bolts 128 encased by spacer collars 129 extending vertically therebetween.

Figure 5:
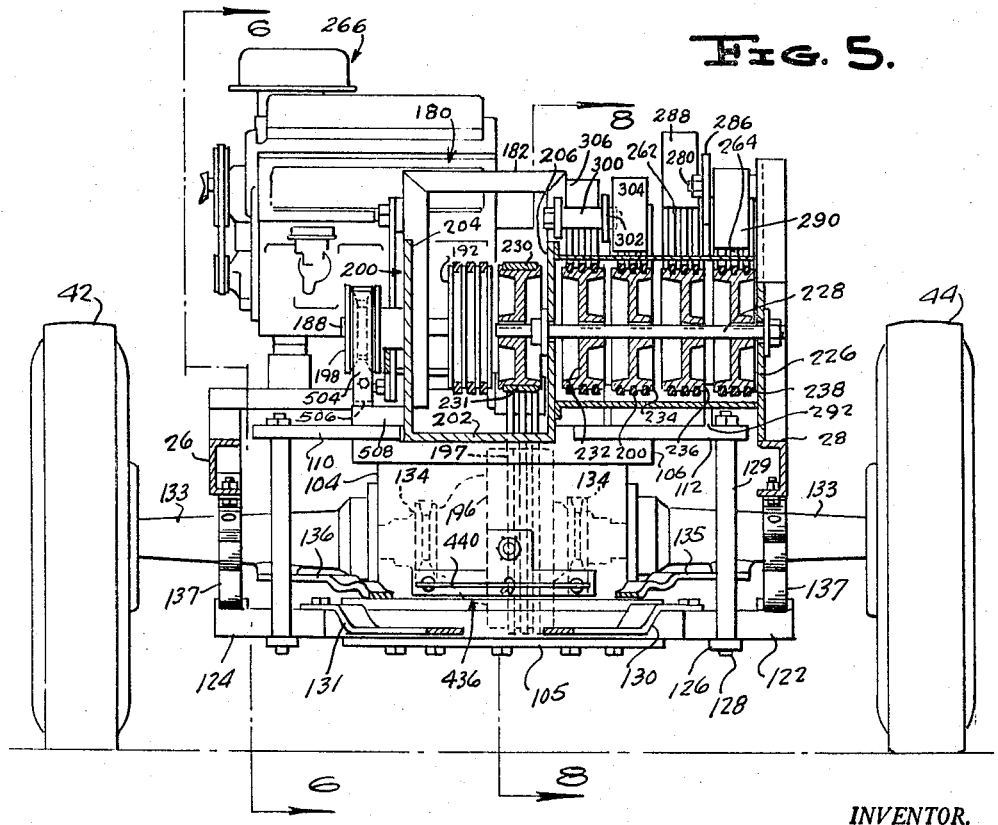
FIGURE 5 is an enlarged detail cross-sectional view, FIGURE 5 being taken substantially on the vertical plane of line 5—5 of FIGURE 2, looking in the direction of the arrows.

The chassis frame is further reinforced by a pair of longitudinally extending rectangular brace members 130, 131 of which the brace member 130 is connected, at its opposed ends, to the channel members 76 and 122, and the brace member 131 has its opposed ends connected to the channel members 78 and 124 (see FIGURES 3 and 5). The brace members 130, 131 are inwardly bowed and twisted, as at 130', 131', the twisted portions being superimposed against one another in side-by-side relation and so held by means of a bracket 132 having a bight 132a which spans the twisted portions 130', 131' and from the opposed ends of which (see FIGURE 10) depend side arms 132b, 132c, the latter being reverted at 132d and 132e, respectively, and which terminates in downwardly turned flanges 132f, 132g, which engage against the remotely disposed sides of the twisted portions 130', 131'. The flanges 132f, 132g are held in clamping engagement against the twisted portions 130', 131' by the bolt means 132'. To serve a function to be described, the bight 132a, its side arms 132b, 132c and their associated reverted portions 132d, 132e are disposed above the upper edges of the twisted portions 130', 131' to form a substantially hollow channel 132h.

As in the case of the front wheels, the axles 102 are provided with axle housings 133 which opens into the differential housing 104 on diametrically opposed sides thereof, and a V-belt pulley brake shoe 134 (see FIGURE 5) of the same type as the V-belt pulley brake shoe 100 is splined or otherwise connected to each of the axles 102 in the manner heretofore described. The brake pulleys are, of course, disposed within the housing 104.

As is seen in FIGURES 2, 3, 4, 5 and 6 and 10, the axle housings 50, 52 and the two axle housings 133 are connected together by a pair of crossed steering levers 135, 136, the lever 135 connecting, at one of its ends, with the axle housing 52, and at its other end with the axle housing 133 on the opposed side of the vehicle 20, and the lever 136 connects, at one of its ends, with the axle housing 50, and at its other end with the axle housing 133 on the other side of the vehicle. The levers 135, 136 extend through the channel 132h and normally cross at that point. It should be noted that the levers 135, 136 are of the same length, and that the levers 135, 136, when the front and rear wheels at each side of the vehicle track one another, cross at their respective mid-points. Thus, each increment of turning movement of any one of the wheels introduces the same degree of turning movement in all other wheels. The benefits and advantages to be derived from this construction will be further elaborated below.

As in the case of the front wheel suspension, serpentine springs 137 depend from the chassis side frame members 26, 28 adjacent the rear ends thereof, the springs 137 being of the leaf type and nested, one within the other. The springs 137 have central inverted convolutions which ride on bearing shafts 138 superimposed against the channel members 122, 124.

The inner ends of the axles 46, 48 are connected in driving relation with the differential 140 (see FIGURE 4), and the inner ends of the axles 102 are similarly connected with the differential 142 (see FIGURE 8). Since both differentials are identical in construction, only one will be described in detail.

The described differential is illustrated in FIGURE 4 and it is seen herein that the differential 140 is, of course, disposed within the differential housing 54, and includes a hollow casing 144 substantially cylindrical about its normal horizontal axis and which is integral or rigidly secured to the adjacent inner ends of the brake sleeves 98 of each axle. The inner ends of the axles 46, 48 are provided with beveled gears 146, 148 which, in turn, mesh on opposite sides of the beveled gears 150, 152 carried on the shaft 154 journaled for rotation about an axis shown in FIGURE 4 as being perpendicular to the longitudinal axes of the shafts 46, 48. This is conventional differential construction. Power to the differential 140 is supplied by a cylindrical drum 156 which surrounds the casing 144 and which is formed with an inwardly extending annular flange 158 fixedly secured thereto.

Referring now to FIGURES 2, 4 and 6, as seen herein, there is at the forward end of the vehicle 20, an inverted substantially U-shaped bracket 160 having a central bight 162 which substantially spans the open upper end of the housing 54. A pair of laterally-spaced and substantially parallel side arms 164, 166 depend from opposite sides of the bight 162 and are provided at their lower ends with laterally offset flanges 168, 170, respectively, which are fixedly secured to the flanges 64, 66 as by bolts 172. Extending between and suitably journaled on the arms 164, 166 is a transverse shaft 172 having keyed thereto V-belt pulleys 174, 176, and a third pulley 178 also keyed thereto. The pulleys 174, 176 are disposed between the arms 164, 166, while the pulley 178 is disposed outside of the bracket 160 and is located adjacent the arm 166. The drum 156 is suitably grooved at 156' to receive V-belts therein, and the pulley 174 is disposed immediately over the drum 156, and both the drum 156 and the pulley 174 have trained thereabout the V-belts 179. The pulley 176 is a driven pulley, and as the same is rotated, will cause the pulley 174 to rotate in the same direction. As the pulley 174 rotates, its power is transmitted through the belts 179 to the drum 156 which, in turn, will transmit power to the axles 46, 48. The pulley 178 constitutes a braking pulley, the operation of which will be more fully described below.

Referring now to FIGURES 5, 6 and 8, reference numeral 180 denotes an inverted substantially U-shaped bracket having a bight 182 which substantially spans the open upper end of the housing 104 in vertically spaced relation relative thereto, and from the opposed ends of which depend the side arms 184, 186, the lower ends of which are fixedly connected to the flanges 110, 112.

As in the case of the bracket 160, a shaft 188 extends between and is rotatably supported on the arms 184, 186 and has keyed thereto a pair of V-belt pulleys 190, 192. The V-belt pulley 190 is disposed immediately over the drum 196 housing the differential 142, and the drum 196 and the pulley 190 are connected in driving relation by means of the V-pulley belts 197. The pulley 192 is a driven pulley and is connected, in a manner to be described, with a power source.

Also keyed to the shaft 188 on the exterior side of the arm 186 is a V-belt brake pulley 198 to which further reference will be made.

Reference numeral 200 (see FIGURES 5 and 6) designates, in general, a substantially U-shaped channel member, the channel member extending longitudinally of the vehicle 20 and having its bight 202 fixedly secured to the cross-frame elements 34, 36 and extending from points adjacent to, but spaced from the brackets 160 and 180. From the longitudinally extending marginal edges of the bight 202 upwardly project in laterally spaced and substantially parallel relation a pair of elongated substantially rectangular side walls 204, 206. Substantially centrally of the lengths of the side walls 204, 206 is a U-shaped bracket 208 (see FIGURES 2 and 6) having a bight portion 210 spanning the upper ends of the side walls 204, 206 and having depending therefrom in laterally spaced and substantially parallel relation a pair of side walls 212, 214 which are superimposed against the exterior sides of the side walls 204, 206. Any suitable securing means may connect the side walls 212, 214, with their associated juxtaposed portions of the side walls 204, 206.

Journaled for rotation between the side walls 204, 206 is a transversely extending shaft 216 to which is keyed a pulley 218 of the conventional type and a second V-belt pulley 220. Also mounted on the shaft 216 on the exterior side of the side wall 204 is a V-belt brake pulley 224.

Adjacent the other ends of the side walls 204, 206 and mounted on the chassis frame member 28 is an L-shaped upright journal bracket 226 in which is journaled one end of a shaft 228 (see FIGURE 5), the other end of the shaft 228 extending through the side wall 206 and being journaled for rotation therein. The aforesaid other end of the shaft 228 has keyed thereto a second conventional type pulley 230 which is aligned with the pulley 218. Trained between and around the pulleys 218 and 230 is a pulley belt 231 (see FIGURE 1 of the drawings). Thus, as the shaft 228 is rotated, the same will drive the pulley 230, the belt 232, the pulley 218, the shaft 216, the V-belt pulley 220, and the V-belt brake pulley 224.

Also keyed to the shaft 228 for rotation therewith are a plurality of V-belt pulleys 232, 234, 236, and 238, the pulleys 232, 234, 236, and 238 being mounted on the shaft 228 in axially-spaced relation and extending between the bracket 226 and the side wall 206.

Two V-belts 242, 244 are trained around the V-belt pulley 220, of which (see FIGURES 1, 2 and 4) the V-belt 242 extends forwardly of the vehicle 20 and is trained around the V-belt pulley 176, the other V-belt 244 extends from the V-belt pulley 220 in the opposite direction (see FIGURES 1 and 2) and is trained around the pulley 192.

Reference numeral 246 designates an inverted, substantially U-shaped top rear cross-brace member which is supported on the chassis side frame members 26, 28, and from which upwardly projects a pair of normally upright standards 248, 250. A shaft 252 extends across and is journaled for rotation between the standards 248, 250 and has keyed thereto for rotation therewith a plurality of stepped V-belt pulleys 254, 256, 258, of which, the pulley 254 is of the smallest diameter, the pulley 256 the next largest diameter, and the pulley 258 of the largest diameter. The pulley 254 is aligned with the pulley 234, the pulley 256 is aligned with the pulley 236, and the pulley 258 is aligned with the pulley 238. A V-belt 260 is trained about the aligned pulleys 234, 254, a second V-belt 262 is trained about the aligned pulleys 236 and 256, and a V-belt 264 is trained about the aligned pulleys 238, 258.

Reference numeral 266 designates, in general, a conventional internal combustion engine or other type of prime mover. The motor 266 is seen to be suitably supported on the top rear cross-brace member 246 (see FIGURE 6), and is provided with a drive shaft 268 (see FIGURE 1) which is coupled, by conventional means, with the shaft 252. The motor 266 includes a speed-reducer unit 270 having an output shaft 272. The speed reducer is geared in such a manner that the output shaft 272 rotates in a direction contra to the direction of rotation of the drive shaft 268. Fixedly secured on the outer end of the output shaft 272 is a V-belt pulley 274 which is aligned with the V-belt pulley 232. A V-belt 276 is trained therebetween.

The drive between the several pulleys described immediately above is of the conventional slip type, and no power will be transmitted from the pulleys 254, 256, 258 unless some pressure is applied to effect tension on the belts connecting these pulleys with the associated aligned pulleys 234, 236, and 238, respectively. To this end, a U-shaped bracket 278 is fixedly secured to the side frame member 28 intermediate the L-shaped upright journal bracket 226 and the upright standard 248. A bolt 280 projects laterally from the bracket 278 and inwardly of the vehicle 20 and carries a spacer collar 282 thereon (see FIGURE 1). The bolt 280 is provided with a bolt head 284, and a lever 286 is pivotally mounted intermediate its ends on the bolt between the bolt head 284 and the adjacent end of the spacer collar 282. Pressure rollers 288, 290 are rotatably mounted on the opposed ends of the lever 286. Thus, when the lever 286 is pivoted in a counterclockwise direction (as viewed in FIGURE 2), the roller 290 will apply pressure to the V-belt 264 to establish a driving connection between the pulley 258 and the pulley 238. In the event the lever 286 is pivoted in a clockwise direction, reference again being made to FIGURE 2 of the drawings, the roller 288 will apply pressure to the belt 262 and will establish a driving connection between the pulley 256 and the pulley 236. The lever 286 has a substantially T-shaped configuration and includes a depending stem 292, to which further reference will be made below.

As is seen in FIGURE 8, a lug 294 projects laterally from the bracket 180 and has secured thereto a laterally projecting headed bolt 298 which carries thereon a spacer collar 300. As in the preceding instance, a substantially T-shaped lever 302 is pivotally supported on the bolt 298 between its head and the adjacent end of the collar 300.

Pressure rollers 304, 306 are rotatably supported on the opposed ends of the lever 302, and as is seen in the several views of the drawings, the pressure roller 304 is disposed in juxtaposition relative to the belt 260, and the roller 306 is juxtaposed relative to the belt 276. Through reference to FIGURES 1 and 2, it will be seen that as the lever 302 is pivoted in a counterclockwise direction, the roller 304 will apply pressure to the belt 260, thereby transmitting a driving force from the pulley 254 to the pulley 234. In a like manner, should the lever 302 be pivoted in a clockwise direction, the roller 306 will be forced into engagement with the belt 276 and a driving force will be applied from the pulley 274 to the pulley 232. The lever 302, as in the case of the lever 286, carries a depending stem 308 (see FIGURES 2 and 8), to which further reference will be made below.

Means are provided for effecting selective engagement of the pressure rollers 288, 290 and 304, 306 with their respective associated belts. These means comprise (reference being made to FIGURES 1, 2 and 6) a substantially U-shaped bracket 310 having a bight portion 312 fixedly secured to the side wall 206, the bight 312 having diverging arms at the opposed ends thereof which project above the upper edge of side wall 206. To the upper or outer ends of the arms 314, 316 is fixedly secured an arcuate member 318 which is, in turn, formed with arcuate grooves 320, 322 which extend transversely therethrough.

The inner sides of each of the grooves 320, 322 are ratcheted as at 324, 326, respectively, in order to hold manually operable levers 328, 330 in a selected adjusted position. As is seen in the several sheets of the drawings, the levers 328, 330 extend downwardly through the arcuate member 318 and are pivotally connected intermediate their respective ends on a common shaft 332 which projects laterally from the sidewall 206.

The pivotal connection is made intermediate the ends of each of the levers to provide a lower end portion thereof for connection with linkage systems.

Referring now more specifically to FIGURE 2 of the drawings, it is seen that the lower end of the lever 330 is pivotally connected at 334 to a rod 336, the other end of the latter being pivotally connected at 338 to the lower end of the stem 308 of the lever 302. The connection is such that when the lever 330 is moved or pivoted forwardly, the lever 302 tilts or pivots in a counterclockwise direction, causing engagement of the roller 304 with its associated V-belt 260 (see FIGURE 1). On the other hand, when the lever 330 is moved or pivoted rearward, the lever 302 will be caused to pivot in a clockwise direction, causing the roller 306 to engage against its associated belt 276. With the lever 330 located intermediate the ends of the grooves 322, no tension is applied to either of the belts and this lever, when in this position, may be said to be in "neutral."

The lever 328 extends through the groove 320 and is pivoted, intermediate its ends, on the shaft 332. The lower end of the lever 328 is pivotally connected at 340 to one end of a rod 342 which extends rearwardly and which has its other end pivotally connected at 344 to one end of a link 346. The other end of the link 346 is fixedly secured to one end of a rock shaft 348 having its opposed ends pivotally supported on and adjacent to the upper ends of a pair of standards 350. The lower ends of the standards 350 are rigidly connected to the cross-frame members 36. A lever 352 has one of its ends secured to the other end of the rock shaft 348, and the other end of the lever 352 depends therefrom and is pivotally connected at 354 to one end of a rod 356 (see FIGURE 2). The other end of the rod 356 is pivotally connected at 358 to the lower end of the stem 292 of the roller-carrying lever 286. Thus, as the lever 328 is pivoted toward its rearward position, the rod 342 is moved forwardly causing the rock shaft 348 to turn in a clockwise direction. This same directional movement is imparted to the lever 352 which causes the rod 356 (reference being made to FIGURES 1 and 2) to be drawn forwardly. As the rod 356 moves in this direction, the stem 292 is moved in a similar direction and effects a clockwise movement of the lever 286 forcing the roller 288 into engagement with the belt 262 to place the same under tension.

Pivoting the lever 328 forwardly introduces the reverse movement of the rod 356 and the consequent contraclockwise movement of the lever 286 causing the roller 290 to engage and place the belt 264 under tension.

The foregoing specification describes the drive and control means for delivering power to the pulley 230 to effect its rotation in one direction, or the other, for subsequent transmission of its power to the pulley 218, the shaft 216, and the two pulleys 176, 192, and their respective associated pulleys 174, 190, and to their respective drums 156, 196.

As has been previously stated, there braking systems are provided. These are diagrammatically shown in FIGURE 7, and reference thereto will be made as a more detailed description is set forth in connection with other figures of the drawings.

Referring now to FIGURES 1, 2 and 6, it is seen that an elongated shaft 360 (see FIGURE 1) projects laterally and inwardly from the chassis side frame member 28 adjacent the forward end thereof. The shaft 360, at its inner end, is loosely supported in a cap 362 at one end of a second shaft 364 aligned therewith and supported for rotation in a pair of bracket arms 366, 368 which depend from the bight 202 in laterally spaced and parallel relation.

Fixedly secured to one end of the shaft 364 for rotation therewith and adjacent the sidewall 206 is one end of a foot-brake lever 370. The other end of the shaft 364 has one end of a link 372 rigidly secured thereto which projects angularly and upwardly in a rearward direction for pivotal connection at 373 with one end of a brake rod 374. As is clearly shown in FIGURES 1, 3, 6 and 7, the other end of the rod 374 extends through a pair of spaced, parallel and confronting legs 376, 378 forming end extensions of an arcuate brake shoe 380. Preferably, the extension 378 is provided with a lateral flange 381 that is secured to the sidewall 204 by conventional means 382. The brake shoe 380 has secured thereto a V-shaped brake liner 384 which normally is loosely received within the pulley 224 which, it will be recalled, is rigidly connected or keyed to the shaft 216. As is clearly shown in FIGURES 6 and 7, a helicoidal spring 386 under compression is interposed between the legs 376, 378 to constantly bias the same for movement away from each other to effect brake release, and the assembly is prevented from inadvertent dislodgment by means of a nut 388 that is threaded on the outer end of the brake rod 374 and bears against the leg 376. Thus, application of foot pressure to the foot lever 370 will turn the link 372 in a clockwise direction, reference being made to FIGURES 6 and 7, whereby the brake rod 374 is axially shifted forwardly, causing the leg 376 to move toward the leg 378, whereby the brake shoe 380 clamps its liner 384 against the pulley 224 to arrest or slow down the rotation thereof and consequently the shaft 216. This comprises the main braking system.

An auxiliary braking system is provided and is seen to comprise a vertically elongated, substantially rectangular flange 390 (see FIGURE 10) subtended from the bight 202 centrally of its ends. The flange 390 has fixedly secured thereto a laterally projecting sub-axle 392, and fixedly mounted thereon is a lever 394. The connection is made centrally of the ends of the lever 394, and each end of the lever 394 carries a roller 396, 398, respectively. Projecting laterally from the side frame member 28 (see FIGURES 1, 2, 3, 5 and 6) is a channel-shaped bracket 400. Journaled for rotation in the bracket 400 is a shaft 402 to one end of which is connected one end of a lever 404 having a roller 406 rotatably supported thereon. The roller 406 has a pivotal path of movement between the rollers 396, 398. The other end of the shaft 402 has one end of a lever 408 connected thereto, and the other end of the lever 408 is pivotally connected at 410 to one end of a brake rod 412, the other end of the brake rod 412 being pivotally connected to the foot pedal 414.

Referring now to FIGURES 1, 3, 4, 5, 6 and 7, it is seen that the differential housings 54, 104 are formed with confronting bosses 416, 418, respectively, and to the bosses 416, 418 are bolted at 420, transversely-extending guide plates 422, 424, respectively. The guide plate 422 projects upwardly from its associated boss 416, while the guide plate 424 extends downwardly. The guide plates 422, 424 are transversely bored adjacent each of their respective ends, as at 426, 428, respectively, the bores 426, 428 being aligned with bores 430, 432, respectively, formed in the housings 54, 104.

Reference numerals 434, 436 denote a pair of U-shaped yokes, each having a bight 438, 440 from the ends of which project the pairs of arms 442, 444, and 446, 448, respectively. The pairs of arms 442, 444 are mounted for reciprocation within the aligned bores 426, 430, and the pairs of arms 446, 448 are carried in the bores 428, 432, for reciprocation therein. The bights 438, 440 are connected centrally of their ends to the opposed ends, respectively, of a length of flexible wire or cable 450. As is seen in FIGURES 2, 6, 7, 8, 9 and 10, the cable 450 extends, under tension, over the rollers 396, 398 and below the roller 406.

Reference numerals 100, 134, as stated above, indicate V-belt brake shoe pulleys disposed within the differential housings 54, 104. Surrounding each of the pulleys 100 is an arcuate brake band 452 terminating at its ends in legs 454, 456, and the brake bands 452 are also provided with V-belt brake liners 458. The leg 454 (see FIGURES 4 and 7) each has an offset flange 460 which is fixedly secured to the housing 54. The arms 442, 444, at their respective inner ends, extend through suitable openings formed in the legs 454, 456, and a nut 462 is threaded on each of the legs 442, 444 to prevent inadvertent disassembly. Interposed between the legs 454, 456 and surrounding each of the arms 442, 444 is a helicoidal spring 464 under compression, the spring 464 constantly tending to bias the legs 454, 456 for movement away from each other.

A similar braking means is provided for both axles 102 at the rear of the vehicle 20. In this instance, the arcuate brake bands 466 terminate in confronting legs 468, 470 of which the latter terminate in offset flanges 472 secured to the closure plate 105 for the differential housing 104. The brake bands 466 each carries a V-brake lining 469. The inner ends of the arms 446, 448 extend through the arms 468, 470 and are held against displacement by nuts 474. Helicoidal springs 476 under compression surround each of the arm 446, 448 and constantly tend to bias the legs 468, 470 for movement away from each other.

Thus, depression of the foot level 414 causes the brake rod 412 to move forwardly, whereby the lever 408 is pivoted counterclockwise, as is the lever 404. As the lever 404 so turns, the roller 406 is caused to engage and depress the cable 450 between the rollers 396, 398. As this action takes place, the legs 456 are drawn toward the legs 454 to apply a braking force on their respective associative pulleys 100. At the same time, the arms 446, 448 draw the legs 468 toward the legs 470, causing a braking force to be applied to their respective associated brake pulleys 134.

The emergency brake system is seen to comprise a brake lever 476 (see FIGURES 1, 6 and 7) pivotally mounted intermediate its ends on a shaft 478 that projects laterally from the sidewall 204. Pivotally connected to the lever 476, at 480, 482, above and below the shaft 478 are one of the ends of a pair of forwardly and rearwardly-extending brake rod 484, 486 (see FIGURES 6 and 7). The other end of the brake rod 484 extends through the legs 488, 490 of an arcuate brake shoe 492 having a V-belt brake liner 494. The shoe 492 and its liner 494 engage about the pulley 178 which it will be recalled, is rigidly connected to the shaft 172 (see FIGURE 4). The legs 488 are formed with lateral flanges 496 which are secured to the flange 170 (see FIGURE 6). A helicoidal spring 498 surrounds the rod 484 between the legs 488, 490 and constantly biases the same for movement away from each other.

A similar arrangement is provided at the rear of the vehicle 20 wherein the brake pulley 198 is surrounded by an arcuate brake shoe 500 from the ends of which depend legs 502, 504, the latter terminating in an offset flange 506 which is secured to a channel member 508 (see FIGURES 5 and 6) fixedly secured to the flange 110. The other end of the brake rod 486 extends through the legs 502, 504 and the assembly is held against inadvertent displacement by a nut 510. As before, a helicoidal spring 512 surrounds the rod 486 between the legs 502, 504 and constantly biases the same for movement away from each other.

In the positions shown in FIGURES 6 and 7, the emergency brakes have been set, and to release the same it is only necessary to pivot the lever 476 in the direction of the arrow, as shown in FIGURE 7, or in a clockwise direction, reference being made to FIGURE 6.

The driving and braking systems have now been described in detail, and it now remains to describe the clutching and de-clutching means, and the belt tightening means for insuring that power will be delivered to the wheels when either one of the levers 328, 330 is moved from the neutral positions thereof shown in FIGURES 1, 5 and 6. To this end, a clutching mechanism is generally indicated at 514. As shown, the clutch comprises a vertical standard 516 (see FIGURE 2) fixedly secured to the sidewall 206 and having its upper end projecting thereabove. A rod 518 is pivotally connected, intermediate its ends, at 520, to the standard 516. As is seen in the drawings, the rod 518 extends forwardly and rearwardly from its pivotal connection, and the rear end thereof has a laterally projecting roller 522 rotatably mounted thereon. The roller 522 is superimposed on the belt 231 under normal driving conditions.

The other end of the lever 518 is pivotally connected at 524 to a depending rod 526 which is, in turn, pivotally connected at 528 to one end of a link 530. The link 530 is connected to one end of a shaft 532 (see FIGURES 1 and 2) which projects laterally and inwardly from the chassis side frame member 28. The shaft 532 is suitably journaled for rotation in a bearing 534. Fixedly connected to the shaft 532, intermediate its ends, is one end of a link 536. The other end of the link 536 is pivotally connected to one end of a clutch-operating rod 538, the other end of the rod 538 being pivotally connected with a clutch-operating foot lever 540.

Pivotally conected to the lever 518 between its pivotal connection 520 and the roller 522, is one end of an angularly, downwardly and forwardly-extending lever 542 (see FIGURE 2), the lower forward end of which is pivotally connected to one end of a downwardly and rearwardly inclined lever 544. The lever 544 is pivoted at 546 on the standard 516, and the other end of the lever 544 has laterally projecting therefrom a roller 548 which, under normal driving conditions, engages against the lower flight of the belt 231 in the manner clearly shown in FIGURE 2.

To maintain the rollers 522, 548 releasably against adjacent portions of the belt (see FIGURE 8) 231, one end of a helocoidal spring 550 is connected to the lever 518 adjacent the roller 522, while the other end of the spring is anchored to a bracket 552. Thus, it is seen that the rollers are constantly biased for movement toward the belt 231.

In the several figures of the drawings, the clutch mechanism 514 is shown in its operative or "in" position. To de-clutch, or to put the clutch "out," the operator depresses the foot pedal 540, thereby drawing the clutch-operating rod 538 forwardly. This causes the shaft 532 to rotate in a counterclockwise direction, reference being made to FIGURE 2, whereby the rod 526 is drawn downwardly. This action causes the lever 518 to pivot in the same direction, and at the same time, forces the roller 548 to pivot in the reverse or counterclockwise direction. Thus, both rollers are moved away from and out of contact with the belt 231, and no power is transmitted from the pulley 230. Upon release of the foot pedal 540, the helicoidal spring 550 returns the several component elements of the clutch 514 to their original positions, the rollers 522, 548 engaging the belt 232 and restoring power to the pulley 218.

When slippage occurs in the belt 232 under normal operating conditions, means is provided to increase the tension thereon to insure the driving of the pulley 230. These means comprise a link 554 (see FIGURE 2) having an end thereof fixedly connected to a shaft 532. This link projects upwardly and rewardly, and the other end thereof is pivotally connected to one end of a tension-applying rod 556 (see FIGURES 1 and 2) having its other end pivotally connected to a foot-operated lever 558. As is seen in the drawings, depression of the foot lever 558 causes the shaft 532 to rotate in a clockwise direction, reference being made to FIGURE 2, and in so moving, turns the link 554 in the same direction. This raises the rod 526 and causes the lever 518 to pivot in the same direction. As this action occurs, the roller 522 is forced downwardly against the adjacent portion of the belt 231, applying a pressure thereon greater than the force provided by the spring 550. Simultaneously, the roller 548 is pivoted in a counterclockwise direction to apply a greater pressure thereon than is normally applied by the force of the spring 550.

Means are also provided for increasing the tension of the V-belts 242, 244 to further insure the driving of the vehicle wheels. These means comprise a segment-shaped ratchet member 560 fixedly secured to the foot portion 562 (see FIGURE 1) of an L-shaped bracket secured to the arcuate member 318 and projecting laterally therefrom. To the leg portion 564 is pivotally connected at 556 (see FIGURE 2) a hand-operated ratchet lever 568. One end of an offset lever 570 is pivotally connected to the depending portion of the lever 568 by a pin and slot connection well known in the art, as shown in the patent to Anderson No. 1,387,445, and also shown, in FIGURE 20. As shown in FIGURES 6 and 20, a pin 568' which is carried by the lever 568 rides in a slot 570' which is formed in the lever 570. The other end of the lever 570 has rotatably mounted thereon a roller 572 superimposed on the belt 242, and the lever 570 is pivotally supported on a pin 574 projecting laterally from the sidewall 204 and carrying a spacer collar 576 thereon.

An elongated lever 578 (see FIGURES 1 and 6) is pivotally connected at 580, adjacent one of its ends, to the lever 568, and the other end of the lever is pivotally connected at 582 to the upper end of an elongated upright lever 584 (see FIGURE 6). The lever 584 is secured and projects forwardly from the arm 164 of the U-shaped bracket 160 (see FIGURE 2). The lever 584 has, mounted for rotation thereon, a roller 590 that is adapted to engage against the belt 178.

To the other end of the lever 578 are pivotally connected at 592 (see FIGURE 1) one of the ends of a pair of forwardly and rearwardly-extending levers 594, 596, respectively. The lever 594 is pivotally connected intermediate its ends on a pin 598 that projects laterally from the sidewall 204 and carries a spacer collar 600 thereon. The other end of the lever 594 has a roller 602 rotatably mounted thereon and superimposed against the belt 244.

The other end of the lever 596 extends angularly and downwardly from the pivot pin 592 (see FIGURES 2 and 6) and is pivotally connected at 604 to the lower end of a lever 606 that is pivotally connected at 608 to a hanger bracket 610 fixedly secured to and projecting rearwardly of the arm 186 of the bracket 180. The lever 606 carries a laterally projecting roller 612 which is engageable against the belt 197.

Thus, when the lever 568 is pivoted in a counterclockwise direction, reference being made to FIGURE 6, the levers 578, 596 are moved rearwardly of the vehicle 20 causing the levers 570, 594 to pivot in a clockwise direction, forcing the rollers 572, 602 into engagement with their respective associated belts 242, 244. Simultaneously, the lever 584 will be pivoted in a clockwise direction, forcing the roller 590 into engagement with the belt 178, and the lever 606 turns counterclockwise to force the roller 612 into engagement with the belt 197.

It is thus seen that all four wheels of the vehicle are simultaneously driven and may be simultaneously braked. Additionally, all four of the wheels 38, 40, 42 and 44 are simultaneously turned by steering means to be described.

The steering means 616 includes a yoke 618 (see FIGURES 1 and 2) having a stem 620 from which diverge a pair of arms 622, 624, the outer ends of the latter being fixedly secured at 626, 628 (see FIGURE 3) to the axle housings 50, 52 adjacent their respective outer ends.

To the stem 620 is connected a bracket plate 630 that is connected, by a universal joint 632, to one end of a rod 634. The other end of the rod 634 is connected, also by a universal joint 636, to one face of a gear 638 subtended at an angle from a bracket 640 (see FIGURES 1, 3 and 4) on axle 642. As is seen in the drawings, the bracket 640 is fixedly secured to the forward end of the side frame member 28. A second bracket 644 projects upwardly from the forward end of the frame member 28 to which it is affixed, and rotatably receives therein the lower end of an upwardly and rearwardly inclined steering rod 646. Adjacent the lower end of the rod 646 is secured a gear 648 which meshes with the gear 638. The upper end of the steering rod 646 is suitably journaled and supported by brace means, indicated, in general, at 650. At the extreme upper end of the steering rod 646 is secured a conventional steering wheel 652.

Now it is seen that as the wheel 652 is turned counterclockwise, reference being made to FIGURE 1, the gear 648 will rotate in the same direction and will drive the gear 638 in the reverse direction. This draws the rod 632 angularly and upwardly, causing the stem 620 to move in the direction of the side frame member 28, whereby the differential housing 54 and its associated axle housings 50, 52 are turned counterclockwise. The degree to which the housing 54 and the axle housings 50, 52 is turned is transmitted through the brace members 135, 136 to the axle housings 134 and differential housing 104 in the same increments, but in the reverse direction. Should the steering wheel 652 be turned clockwise, the pairs of wheels 38, 40 and 42, 44 will turn in directions reversed from those described immediately above.

If desired, the brackets 160, 180 may have an upwardly projecting flange 654, 656 fixedly secured to the bights 162, 182, respectively, to receive therethrough one of the ends of a pair of radius rods 658, 660, respectively. Nuts 662, 664 threaded on the rods 658, 660, on opposite sides of the flanges 654, 656, clamp the aforesaid one end of the rods 658, 660 thereto. The other ends of the rods 658, 660 are connected to a stub bolt 666 which projects upwardly from the bight 210.

FIGURES 11, 12 and 13 illustrate a second embodiment of this invention which departs from the first embodiment thereof in several significant ways. In the second embodiment, for example, the front differential housing 54 is provided with diametrically-opposed flanges 700, 702 which are bolted at 704, 706 to the base or plateau portions 708, 710 of serpentine springs 712, 714. The forward ends of the springs 712, 714 are bolted at 715 to the forward ends of the chassis frame members 26, 28, and their respective other ends are connected in brackets 716 fixedly secured to the cross frame member 34.

The steering means in the second embodiment of the invention includes a conventional steering wheel 718 connected to one end of the steering shaft 720, the other end of the shaft 720 extending through and being journaled for rotation in an inverted L-shaped bracket 722 projecting laterally and inwardly from the frame member 28. To the lower extending end of the shaft 722 is fixedly secured a pulley 724.

A second bracket 726 projects laterally from the frame member 28 and carries thereon a shaft 728 on which is mounted for rotation a gear 730 that meshes with a second gear 732. The last-named gear is fixedly secured to a shaft 734 on which is mounted and keyed a pulley 736. An endless pulley belt 738 is trained about the pulleys 724 and 738.

Also connected on the shaft 728 is one end of an arm 740, the other end of the arm 740 being connected through a universal joint 742 with one end of the rod 744. The other end of the rod 744 connects through a universal joint 746 with the bracket 630 that connects with the stem 620.

The chassis suspension means at the rear of the vehicle 20 is the same as for the front end thereof, and need not, therefore, be described. It will be noted, however, that in the second embodiment (see FIGURE 13), the rear differential housing 104 is formed with diametrically-opposed flanges 748, 750 to which the rear ends of the brace members 130, 131 are connected, and that a second pair of brace members 752, 754 have one of their respective ends connected thereto adjacent the twisted portions 130', 131', while their other respective ends are connected to the axle housings 133.

In all other respects, the two embodiments are substantially identical in construction.

The second embodiment of this invention discloses front wheel steering only. The front wheel steering is accomplished by turning the steering wheel 718, for example, in a counterclockwise direction (reference being made to FIGURE 11) which, in turn, turns the shaft 720 in the same direction. The pulley 724 is rotated, counterclockwise, and the same is true of the pulley 736 connected thereto through the pulley belt 738. The shaft 734 rotates in the same direction as does the gear 732. The gear 730, however, rotates in the reverse direction.

The arm 740 moves in the same direction and draws the rod 744, reference being made to FIGURE 11, upwardly and toward the side frame member 28. This causes the front wheels 38, 40 to turn clockwise together with the differential housing 54. Turning the steering wheel 718 in the reverse direction, or clockwise, results in the reversal movement of the above-described parts and the consequent turning of the wheels 38, 40 in a counterclockwise direction.

FIGURE 14 is an enlarged side elevational view of one of the braking pulleys showing the details of its construction. The braking pulley shown in FIGURE 14 could be, for example, the braking pulley 178. This figure clearly shows the brake shoe 500, its liner 501, the depending legs 502, 504 and the inwardly bent flange 506. As is clearly seen in this figure, the rod 486 passes through the legs 502, 504, and mounted on the shaft or rod 486 is a helicoidal spring 512 which surrounds the rod 486 and bears against, at its opposed ends, the legs 502, 504. The arms 502, 504 are constantly biased for movement away from one another and the rod 486 has threaded thereon lock nuts 510 to prevent inadvertent disassembly of the braking apparatus, as well as to afford means for applying pressure from the brake shoe 500 to the pulley 198.

Having described in detail two embodiments of this invention, their operation is deemed to be self-evident. However, to assist in the understanding of this invention, a brief résumé of the operation will be set forth below.

Assuming that the motor 266 is operating, its drive shaft 268, connected to the shaft 252, will cause the pulleys 254, 256, 258 to rotate. Further assuming that the levers 328, 330 are in the position shown in FIGURE 1, that is, a "neutral," and that the foot levers 370, 414, 540 and 558 have not been depressed by the operator, no power will be transmitted to the pulleys 234, 236 and 238. Consequently, the shaft 216 does not operate, and neither will the pulley 232.

Now let it be assumed that the operator of the vehicle desires to drive the vehicle 20 rearwardly. The operator now depresses the foot-operated clutch lever 540, depressing the same to cause the pulleys 522, 548 to move away from the adjacent portions of the flat pulley belt 231. The emergency brake system is now released by pulling the ratchet lever 568 rearwardly, and the lever 330 is also pulled rearwardly. This causes pivotal movement of the lever 302 forcing the roller 306 into contact with the belt 276. Power is now delivered from the speed reducer 270 and its shaft 272 to the reversing pulley 274.

The belt 276 is now driven, as is the pulley 232, but no power is transmitted to the shaft 216 since the roller 522 is in its "out" position.

The operator now releases the clutch lever 540 causing the rollers 522, 548 to re-engage against the belt 231, thereby driving the pulley 230. As the pulley 230 is rotated, the pulleys 192 and 240 are rotated via their respective belts 244 and 242.

With these two last-named pulleys rotating, the shafts 172 and 188 also rotate and drive the pulleys 174 and 190. These pulleys through their respective belts 178, 194 drive the drums 156, 196, thereby causing the axles 46, 48 to turn through their respective differentials 140, 142. The wheels 38, 40, 42 and 44 are thus turned to move the vehicle in a rearward direction.

Assuming now that it is desired to drive the vehicle 20 forwardly, the foot-operated clutch lever 540 is again depressed to move the rollers 522, 548 out of contact with the adjacent portions of the belt 231 and the lever 320 is moved to its forward position, thereby forcing the engagement of the roller 304 with the belt 360. The clutch pedal 540 is now released, whereby power is delivered from the motor 266 to the shaft 252, the pulley 254, the belt 260, pulley 232, and to the shaft 228. As before, the shaft 228 rotates the pulley 230, and through the belt 231 power is transmitted to the pulley 218 to drive the shaft 216 in the reverse direction. As the shaft 216 turns, the pulleys 220, 222 are rotated in the same direction and drive through their associated belts 242, 244 the pulleys 174, 192. These pulleys drive, in turn, the belts 178, 194 to drive the drums 144, 196 which, as has been described heretofore, drive the differentials 140, 142.

The above-described drive may be considered as being a low-speed forward drive delivering much power to the wheels of the vehicle.

When the vehicle 20 has reached a desired low speed, the operator now depresses the clutch-operating lever 540 throwing the rollers 522, 548 out of contact with the belt 231 and shifts the lever 330 to its neutral position, as shown in the drawings. In order to obtain the next higher speed, the operator now draws the lever 328 rearwardly, causing the roller 288 to engage against its associated belt 262 to again drive the shaft 216. This takes place, of course, only after the clutch pedal 540 has been again reelased.

Assuming now that the operator wishes to drive the vehicle 20 in third, or in its high-speed condition, the clutch lever 540 is again depressed to remove the rollers 522, 548 from the belt 232 and the lever 328 is, thereafter, moved forwardly to cause engagement of the roller 290 with its associated belt 264. Again, and upon the release of the clutch-operating lever 540, the belt 231 is driven to effect rotation of the shaft 216 and the consequent rotation of the wheels of the vehicle in the manner previously described.

Figure 17:
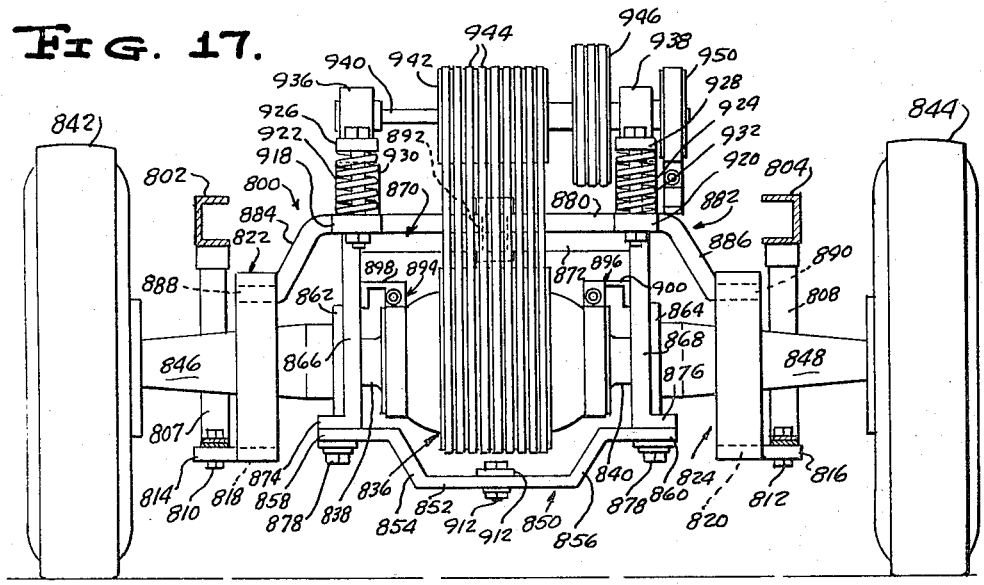
FIGURE 17 illustrates a modification of the two-wheel drive mechanism.
Figure 18:
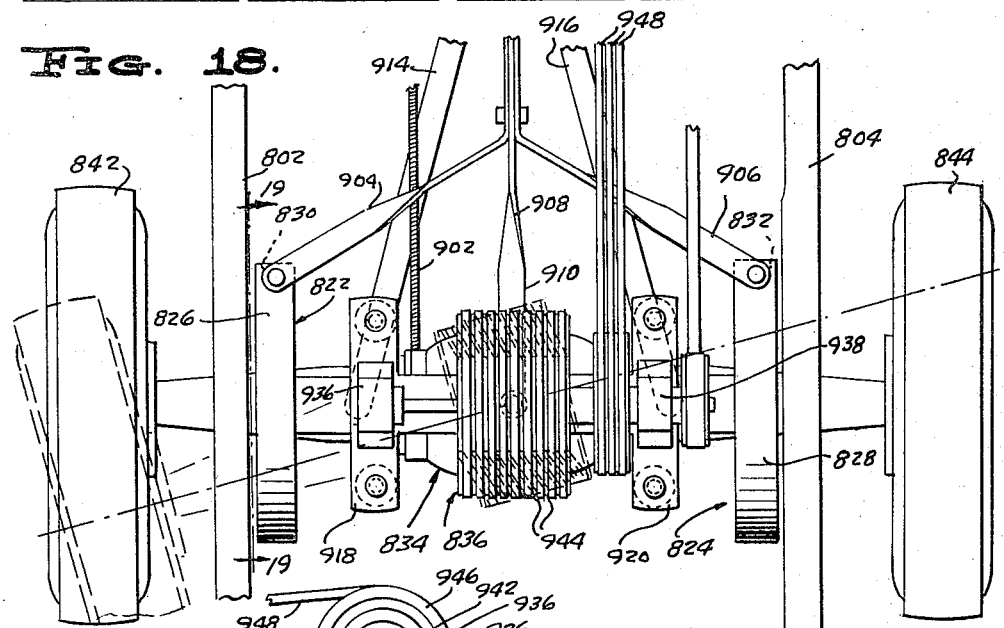
FIGURE 18 is a top plan view of the modification shown in FIGURE 17.
Figure 19:
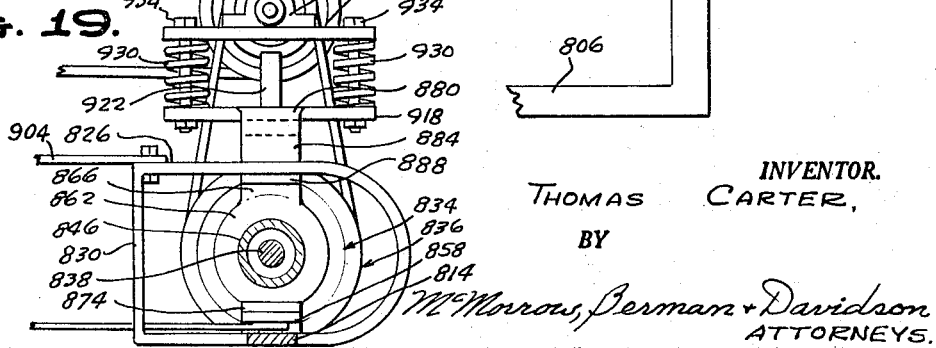
FIGURE 19 is a fragmentary side elevational view thereof, partly in cross-section, FIGURE 19 being taken substantially on the vertical plane of line 19—19 of FIGURE 18, looking in the direction of the arrows.

Another embodiment of this invention is illustrated in FIGURES 17 to 19, inclusive, reference numeral 800 designating, in general, a modification of the two-wheel drive, steering apparatus, and suspension means, wherein the chassis side frame members are designated at 802 and 804, and the front chassis frame member is indicated at 806. As before, the chassis frame members 802, 804 have secured thereto the opposed ends of serpentine springs 807, 808. At the respective deepest depressed points, the springs 807, 808 are rigidly connected at 810, 812 to lugs 814, 816 which laterally and outwardly diverge away from one another from the lower arms 818, 820 of open ogive-shaped frames 822, 824. The frames 822, 824 include upper arms 826, 828 connected at their rear ends with the arms 818, 820 by bights 830, 832.

Disposed intermediate the frames 822, 824 is a differential 834 of the type previously described. The differential 834 is driven by a V-belt pulley 836 to which further reference will be made, and the differential drives the axles 838 (only one being shown) which project laterally through and beyond the frame members 822, 824 and beyond the side frame members 802, 804 for driving connection of the wheels 842, 844. The axles are encased in suitable housings 846, 848.

Reference numeral 850 designates a substantially U-shaped brace having a bight 852 from the opposed ends of which outwardly diverge a pair of arms 854, 856, the outer ends of the latter terminating in normally horizontal flanges 858, 860. The flanges 858, 860 are disposed below the axle housings 846, 848, and the inner ends of the housings are fixedly secured or formed integral with collars 862, 864 which project laterally from the arms 866, 868 of an inverted U-shaped support frame 870 having a bight 872. The lower ends of the arms 866, 868 terminate in diverging feet 874, 876 secured to the flanges 858, 860 by bolts 878.

Superimposed over the bight 872 is the bight 880 of a second inverted substantially U-shaped support frame 882 having outwardly diverging arms 884, 886 which terminate in outwardly turned, normally horizontal, end flanges 888, 890. The flanges 888, 890 are rigidly connected, as by welding, to the undersides of the upper arms 826, 828 of the frames 822, 824. A pivot pin 892 connects the central portions of the bights 870, 882 so that the frame 870 and its associated elements connected therewith may swing freely about the pin 892 in order to effect a turning movement of the wheels 842, 844, in the manner shown in dotted lines in FIGURE 8.

Both axles 846, 848 are provided with brakes 894, 896, similar to those described above, and the fixed ends of the brake shoes, in this instance, are connected by lateral flanges 898, 900 to the arms 866, 868. The free ends of the brake shoes connect via a Bowden cable 902, only one being shown, to the foot pedal 414.

Brace members 904, 906, similar to the brace members 130, 131, connect the frames 822, 824 with similar frames (not shown) at the other end of the vehicle, and extending between the brace members 904, 906 and rigidly secured thereto is a stabilizing brace 908 having a downwardly turned tongue 910 pivotally connected at 912 to the bight 852.

As in the previous embodiments, the turning of the wheels 842, 844 is achieved through the cross levers 914, 916 similar to the cross levers 135, 136 (see FIGURE 3), the ends of the levers 914, 916 being connected to the bolts 878. Any one of the steering means described above may be used in this embodiment of the invention.

Reference numerals 918, 920 (see FIGURES 17 and 19) denote a pair of cross supports which project from both sides of the bight 880 adjacent each end thereof, and intermediate the ends of each cross support and projecting upwardy therefrom is a stop lug 922, 924.

Normally supported above the cross supports 918, 920 and the stop lugs 922, 924 are a pair of bars 926, 928 held in suspension by means of helicoidal springs 930, 932, the springs surrounding bolts 934 which loosely tie the bars 926, 928 to their respective cross supports 918, 920.

Each of the bars 926, 928 carries journal blocks 936, 938 in which a shaft 940 is journaled for rotation, the shaft 940 having a V-belt pulley 942 keyed thereto which is aligned with a pulley 836. A plurality of V-belts 944 are trained around these two pulleys to establish a driving connection therebetween.

A second V-pulley belt 946 is keyed to the shaft 940 and is driven through the V-belt 948 in the same manner as is the pulley 176. Also, the shaft 940, at one of its ends, has keyed thereto a brake pulley 950 identically constructed and operated as is the brake pulley 178.

From the foregoing description it is clear that as the wheels 842, 844 are turned in either direction, the normal tension on the belts 944 is increased, causing the bars 926, 928 to swing vertically in opposite directions, the bolts 934 serving as fulcrums (it being recalled that the bars 926, 928 are loosely mounted thereon). Thus, if the wheels 842, 844 shown in full-line position in FIGURE 18 were turned to their dotted-line position illustrated therein, the forward end of the bar 926 will swing downwardly against the tension of the adjacent spring 930, while the rear end of the bar 926 moves in the same direction against the tension of its immediately adjacent spring 932. The converse is true, of course, if the wheels 842, 844 were to be turned in the opposite direction.

The floating of the shaft 940 on the structure described tends to stabilize the power transmission to the wheels of the vehicle and also serves to inhibit and/or prevent the disengagement of the pulley belts 948 from the pulleys 836, 942 when the vehicle is engaged in making a turn.

Having described and illustrated several embodiments of the instant invention, it will be understood that the same are offered merely by way of example, and that this invention is to be limited only by the scope of the appended claims.

What is claimed is:

1. An automotive vehicle comprising a chassis including a pair of elongated laterally spaced side frame members, motor means mounted on said chassis adjacent one end thereof, a resilient means connected to and depending from each of said side frame members adjacent each end thereof, a pair of vertically elongated substantially hollow cylindrical differential housing, an annular member surrounding each of said housings, respectively, and having diametrically opposed rigid members projecting away therefrom, means rotatably supporting said housings, respectively, in one of said annular members, means connecting the remotely disposed ends of said rigid members of one of said housings with a pair of springs adjacent one end of said chassis, means connecting the remotely disposed ends of the rigid members of the other of said housings with a pair of springs adjacent the other end of said chassis, differential means disposed within each of said differential housings, an axle housing projecting from diametrically opposed sides of each of said differential housings and projecting through and between each side frame member and said springs, an axle disposed in each of said axle housings and having one of their respective ends connected with said differential means, a wheel connected to the other ends of said axles, a pair of crossed levers, said levers having one of their respective adjacent ends connected to said axle housings adjacent one end of said chassis, the other ends of said levers being connected with said axle housings adjacent the opposite sides of said chassis, means supported on said chassis adjacent the other end thereof to apply a turning force in one direction or the other on the adjacent pair of said axle housings and to thereby turn the other pair of axle housings in the opposite direction and in substantially equal increments and causing said differential housings to turn in the same directions, and means connecting said motor means in driving relation with each of said differential means.

2. An automotive vehicle as defined in claim 1, and clutch means mounted on said chassis and connected between said motor means and differential means.

3. An automotive vehicle as defined in claim 2, and manually-operable brake means disposed in said annular member for braking said differential means.

4. An automotive vehicle as defined in claim 3, and manually operable means on chassis for braking said motor means.

5. An automotive vehicle comprising a chassis including a pair of elongated laterally spaced and confronting side frame members, motor means mounted on said chassis and including a drive shaft, a first shaft, means supporting said first shaft for rotation on said chassis, a first series of pulleys of varying diameters mounted for rotation with said first shaft, means connecting said drive shaft with said first shaft to effect rotation of the latter, a second shaft mounted for rotation on said chassis proximate said first shaft, a second series of pulleys of substantially the same diameter fixedly secured to said second shaft and corresponding in number to the number of pulleys in said first series, said first and second pulley series being aligned with one another and with said first and second shafts being laterally spaced and parallel to one another, endless belts slip-connecting each aligned pair of pulleys, a driving pulley mounted on said second shaft for rotation therewith, a third shaft rotatably supported on said chassis intermediate the ends thereof, a third series of pulleys mounted on said third shaft for rotation therewith, said third shaft extending parallel to said first and second shafts and having one pulley of said third series of pulleys aligned with said belt driving pulley, an endless belt trained around said driving pulley and said one pulley of said third series whereby power delivered to said driving pulley is transmitted to said one pulley of said third series, a fourth shaft supported for rotation on and above said chassis adjacent said one end of said chassis, a fourth series of pulleys secured on said fourth shaft, said fourth shaft being parallel to and spaced from said third shaft, one pulley of said fourth series being aligned with a second pulley of said third series, an endless belt trained around said last-named pulleys to transmit power to said one pulley of said fourth series from said second pulley of said third series, a fifth shaft supported on and above said chassis adjacent the other end thereof, a fifth series of pulleys secured on said fifth shaft for rotation therewith, said fifth shaft being substantially parallel to said third shaft, one of said pulleys of said fifth shaft being aligned with a third pulley of said third series, an endless belt trained about said last-named pulleys to transmit power to said one pulley of said fifth series from said third pulley of said third series, a pair of vertically elongated hollow cylindrical differential housings, an annular member for each of said housings rotatably supporting said housings therein, said housings being disposed adjacent the opposed ends of said chassis, each of said annular members having a pair of channel members projecting diametrically away therefrom, a serpentine spring depending from each end of said side frame members, said channel members being secured in each adjacent pair of springs at each end of said chassis, a differential disposed in each of said housings, a pulley drum encasing and secured to each of said differentials, a pair of axles for each of said differentials, each of said pair of axles having one of their respective ends connected with one of said differentials, respectively, and projecting diametrically away therefrom and through and between said side frame members and their associated springs, a wheel mounted on the remotely disposed ends of said pairs of axles, said pulley drums being parallel to, respectively, a second pulley on said fourth and fifth shafts, and an endless belt trained around said second pulleys of said fourth and fifth shafts and their respective aligned pulley drums.

6. An automotive vehicle as defined in claim 5, and selectively operable means for tightening said belts trained around said aligned pairs of pulleys of said first and second series thereof to effect rotation of said second shaft at a selected speed.

7. An automotive vehicle as defined in claim 6, and clutch means interposed between said driving pulley and said one pulley of said third series.

8. An automotive vehicle as defined in claim 7, and a third pulley mounted on each of said fourth and fifth shafts, and manually operable braking means surrounding said last-named pulleys to arrest rotation of said fourth and fifth shafts.

9. An automotive vehicle as defined in claim 7, and a brake pulley fixedly secured to each of said axles and disposed within said differential housings, and manually operable means connected with said brake pulleys to arrest the rotation of said axles.

10. An automotive vehicle as defined in claim 8, and a brake pulley fixedly secured to said third shaft for rotation therewith, a brake shoe surrounding said last-named brake pulley, and manually operable means for braking said last-named brake pulley to arrest the rotation of said third shaft.

11. An automotive vehicle as defined in claim 10, and steering means for effecting pivotal movement of a pair of adjacent axles, said steering means comprising the steering rod mounted for rotation on said chassis, a steering wheel fixedly secured to one end of said steering rod, a pulley mounted on the other end of said steering rod, a bracket fixedly secured to one of said side frame members and projecting laterally therefrom, a shaft extending transversely through said bracket and having a pulley fixedly secured to one end thereof in alignment with said first steering rod pulley, an endless belt trained around said last-named pulleys, a gear fixedly secured to the other end of said shaft, a second gear, means supporting said second gear for rotation on one of said chassis side frame members, said second gear being in mesh with the first of said gears, said second gear including a mounting shaft, an arm having one of its ends fixedly secured to said mounting shaft for rotation therewith, a rod, universal means connecting one end of said rod with the other end of said arm, a yoke including a stem and a pair of diverging arms, means connecting the other ends of said arms with a pair of said axles, and universal joint means connecting the other end of said rod with said stem.

12. An automotive vehicle as defined in claim 10, and means for steering said vehicle, said means comprising an elongated steering rod mounted for rotation on said chassis, a steering wheel fixedly secured to said rod at one end thereof, a gear fixedly secured to the other end of said rod for rotation therewith, a second gear supported for rotation on said chassis and meshing with said first gear, an elongated rod, universal joint means connecting one end of said rod with one side of said second gear, a yoke including a stem and a pair of diverging arms, means connecting said arms with a pair of said axles, and universal joint means connecting the other end of said rod with said stem.

13. An automotive vehicle as defined in claim 12, and means supported on said chassis and selectively operable to apply tension to said belt trained around said aligned one pulley of said fourth series and said second pulley of said third series, a tension-applying means for applying tension to said endless belt trained around said one pulley of said fifth shaft and said third pulley of said third series, and means for applying tension to said endless belts extending between said second pulleys of said fourth and fifth shafts and said differential drums.

14. Automotive vehicle front wheel drive and steering means comprising a pair of laterally-spaced, elongated, longitudinally extending chassis side frame members, a serpentine spring connected to said frame members adjacent the front ends thereof, an open ogive frame member disposed adjacent each of said frame members and its associated spring, said ogive frame members each including a pair of vertically spaced arms, a lug projecting laterally from the lower ones of each of said arms and rigidly connected with the immediate adjacent one of said springs, an inverted substantially U-shaped support frame including a bight and an arm diverging outwardly from each end thereof, means rigidly securing the outer end of each of said last-named arms with the uppermost ones of the arms of said ogive frame, a frame subtended and pivotally mounted on the bight of said inverted U-shaped frame, a differential supported on said subtended frame, a pair of axles having one of their respective ends connected in driving relation with said differential, the other ends of each of said axles projecting through said ogive frames and beyond said chassis side frame members and said springs, a wheel mounted on each of said other ends of said axles for rotation therewith, pulley means for accommodating a plurality of belts directly connected to said differential, resilient means mounted on said inverted U-shaped frame, a second pulley mounted on said resilient means and aligned with said first pulley, a plurality of belts trained around said first and second pulleys, a third pulley, said third pulley being connected in driving relation with respect to said second pulley, and means mounted on said chassis frame members for driving said third pulley.

15. Automotive vehicle front wheel drive and steering means as defined in claim 14, and braking means connected to said second and third pulleys.

16. Automotive vehicle front wheel drive and steering means as defined in claim 15, and braking means for each of said axles.

17. A motor-driven wheeled vehicle comprising a chassis including a pair of laterally spaced side frame members, a pair of aligned axles for each end of said chassis and extending transversely thereof, a wheel mounted on the remotely disposed ends of each pair of said axles, differential means supported on said side frame members adjacent each end of said chassis and connected in driving relation with the adjacent inner ends, respectively, of each pair of aligned axles, each of said differential means including a rotatable driven differential housing, motor means supported on said chassis and connected to the power input side of said transmission means, a power take-off shaft connected to the power output side of said transmission means and being rotatably driven thereby, endless flexible means connecting each differential casing in driven relationship with respect to said power take-off shaft, and manually operable braking means mounted on said chassis engageable with said flexible means to arrest rotation of said differential casings and consequently of said axles.

18. A motor-driven vehicle as defined in claim 17, wherein resilient suspension means are connected to and depend from each side frame member adjacent each end thereof, a substantially rigid member extending between and being fixedly-secured to said suspension means at each adjacent pair of ends of said side frame members, means rotatably supporting said differential housings on one of said rigid members, respectively, for rotation about a vertical axis, and manually-operable steering means connected with said axles to effect the turning of each pair of axles substantially simultaneously and in reverse directions about asid vertical axes.

19. A motor-driven wheeled vehicle comprising a chassis including a pair of laterally spaced side frame members, a pair of aligned axles for each end of said chassis and extending transversely thereof, a wheel mounted on the remotely disposed ends of each pair of axles, differential means supported on said side frame members adjacent each end of said chassis and connected in driving relation with the adjacent ends, respectively, of each pair of aligned axles, each of said differential means including a rotatable driven differential casing, a shaft for each differential casing, means rotatably supporting each of said shafts transversely of said chassis adjacent each end of said chassis and in vertically spaced relation, respectively, with respect to each of said differential casings, a shaft extending transversely of said chassis intermediate its ends and supported for rotation thereon in vertically spaced relation relative thereto, motor means supported on said chassis and connected in driving relation relative to said last-named shaft, endless flexible belt means connecting said motor means in driving relation with said last-named shaft, endless flexible belt means connecting said first shafts in driving relation with, respectively, their immediately adjacent differential casings, and manually operable brake means supported on said chassis adjacent each end thereof, said brake means being engageable with, respectively, said last-named flexible belt means between each of said first shafts and their respective said differential casings.

20. A motor-driven wheeled vehicle as defined in claim 19, wherein a brake pulley is fixedly connected to, respectively, each of said first shafts, and a brake shoe for each of said pulleys, said brake shoes being supported on said chassis and being manually operable for engagement with their respective brake pulleys.

21. A motor-driven wheeled vehicle as defined in claim 19, wherein a brake pulley is fixedly connected to said last-named shaft for rotation therewith, and manually-operable brake shoe means supported on said chassis for engagement with said last-named brake pulley.

22. A motor-driven vehicle as defined in claim 19, wherein a brake pulley is fixedly connected to, respectively, each of said first shafts, a brake shoe for each of said brake pulleys, said shoes being supported on said chassis and being manually operable for engagement with their respective brake pulleys, a brake pulley fixedly-connected on said last-named shaft for rotation therewith, and manually operable brake shoe means supported on said chassis for engagement with said last-named brake pulley.

23. A motor-driven wheeled vehicle as defined in claim 24, wherein a brake pulley is fixedly secured to each adjacent inner end of said axles, a brake shoe for each of said last-named brake pulleys, and manually operable means on said chassis to effect operation of said last-named brake shoes.

24. A motor-driven vehicle as defined in claim 23, a brake pulley fixedly connected on each of said first shafts, a brake shoe for each brake pulley on said first shafts, said last-named brake shoes being supported on said chassis, and manually operable means on said chassis for effecting operation of said last-named brake shoes.

References Cited by the Examiner

UNITED STATES PATENTS

| | | | |
|---|---|---|---|
| 628,230 | 7/1899 | Ogden | 280—102 |
| 873,620 | 12/1907 | Schwarz | 180—50 |
| 889,251 | 6/1908 | Martin | 280—102 |
| 893,107 | 7/1908 | Snow | 180—50 X |
| 1,042,714 | 10/1912 | Morton | 180—50 |
| 1,267,467 | 5/1918 | Schofield et al. | 280—102 |
| 1,301,342 | 4/1919 | Walter | 180—49 |
| 1,342,861 | 6/1920 | Morton | 180—42 |
| 1,371,641 | 3/1921 | Morton | 180—50 |
| 2,284,661 | 6/1942 | Joy. | |
| 2,290,089 | 7/1942 | Bock | 180—49 |

FOREIGN PATENTS 5,969   3/1905   Great Britain.

A. HARRY LEVY, *Primary Examiner.*